(12) United States Patent
Tubergen

(10) Patent No.: US 10,782,419 B2
(45) Date of Patent: Sep. 22, 2020

(54) METHOD TO DETERMINE CLEARANCE OF AN OBSTACLE

(71) Applicant: Westinghouse Air Brake Technologies Corporation, Wilmerding, PA (US)

(72) Inventor: Gary A. Tubergen, Frederick, MD (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 307 days.

(21) Appl. No.: 15/834,970

(22) Filed: Dec. 7, 2017

(65) Prior Publication Data
US 2019/0179034 A1  Jun. 13, 2019

(51) Int. Cl.
| G01S 19/50 | (2010.01) |
| G01S 19/51 | (2010.01) |
| G01S 19/14 | (2010.01) |
| B61L 23/00 | (2006.01) |

(52) U.S. Cl.
CPC .............. *G01S 19/50* (2013.01); *B61L 23/00* (2013.01); *G01S 19/14* (2013.01); *G01S 19/51* (2013.01)

(58) Field of Classification Search
CPC combination set(s) only.
See application file for complete search history.

(56) References Cited

U.S. PATENT DOCUMENTS

| 8,783,626 B2* | 7/2014 | Cross ...................... B61L 23/14 246/122 R |
| 9,669,851 B2* | 6/2017 | Cooper ..................... B61L 3/10 |
| 9,682,716 B2* | 6/2017 | Noffsinger ................ B61L 3/10 |
| 9,834,237 B2* | 12/2017 | Plotnikov ................. B61L 3/18 |
| 9,902,410 B2* | 2/2018 | Palmer ................ B61L 15/0072 |
| 9,981,674 B1* | 5/2018 | Palmer ................ B61L 15/0081 |
| 10,308,265 B2* | 6/2019 | Fahmy ................ B61L 15/0081 |
| 2005/0107954 A1* | 5/2005 | Nahla .................... B61L 25/021 701/301 |
| 2010/0312461 A1* | 12/2010 | Haynie ................. B61L 25/025 701/117 |
| 2015/0302752 A1* | 10/2015 | Holihan ................. G08G 1/164 246/62 |

(Continued)

OTHER PUBLICATIONS

Luedtke, "Fouling the Track", RCX Press, 2007, pp. 1-2.

(Continued)

*Primary Examiner* — Mamadou L Diallo
(74) *Attorney, Agent, or Firm* — John P. Darling; The Small Patent Law Group, LLC

(57) ABSTRACT

A method of determining when a first train has cleared an intersection a distance to permit travel of a second train through the intersection without risk of collision or contact includes: (a) sampling first GPS data corresponding to a location of a lead vehicle of the first train travelling on a first track when the lead vehicle passes proximate a marker; (b) sampling second GPS data corresponding to a location of a last vehicle of the first train moving on the first track; (c) comparing the second GPS data and the first GPS data: (d) repeating steps (b)-(c) until the location corresponding to the first GPS data and the location corresponding to the second GPS data are within a predetermined distance of each other, and (e) generating a signal when the locations are within the predetermined distance.

18 Claims, 5 Drawing Sheets

(56) References Cited

U.S. PATENT DOCUMENTS

2019/0279506 A1* 9/2019 Kelgernon ............... G08G 1/16

OTHER PUBLICATIONS

Government of India, Ministry of Railway, Railway Board, "Functional Requirements Specification for End-of-Train Telemetry (EoTT) System for use on Indian Railways Freight Stock", Specification No. EoTT/DEV/N/4, 2017, New Delhi, India.

* cited by examiner

METHOD TO DETERMINE CLEARANCE OF AN OBSTACLE

BACKGROUND OF THE INVENTION

Field of the Invention

The present invention relates the safe movement of two trains through an intersection of a pair of tracks and, more particularly, when one train travelling through the intersection, has moved a distance away from the intersection to permit the safe movement of another train through the intersection in a manner to avoid contact with the one train.

Description of Related Art

Railroad operations often require a determination when the rear of a first train is clear of the intersection of a pair of tracks, such as track switch or siding opening, such that a second train can safely pass through the intersection without contacting the first train. In the past, personnel in the final car, e.g., the caboose, of the first train or walking alongside the track proximate the rear car of the first train would visually confirm clearance of track intersections. However, when cabooses were removed from trains other methods had to be used because there was no guarantee that such personnel were readily available to visually confirm such clearance.

One other method is to use an odometer in the locomotive in conjunction with the known length of the train to determine the distance traveled from the intersection and determine the location of the last car relative to the intersection. If the train length is not accurately known, however, the position of the last car would could not be determined.

SUMMARY OF THE INVENTION

Generally, provided is an improved method for determining when a first train travelling on the first track has traveled away from an intersection of the first track and a second track to permit the safe travel of a second train on the second track through the intersection without risk of contact between the first and second trains.

According to one preferred and non-limiting embodiment, disclosed herein is a method for determining the last car position independent of operator knowledge of train length. It utilizes a computer including one or more processors and a GPS system.

In one preferred and non-limiting embodiment, one processor coupled to a first GPS receiver is located in the first or leading vehicle or car of the train, e.g., the locomotive, and another processor coupled to a second GPS receiver is located on the rear vehicle or car of the train. The processors can be linked by a communication channel. In one preferred and non-limiting embodiment, the communication channel can be comprised of a wired network, a wireless network, or the combination of a wired and wireless network. In one preferred and non-limiting embodiment, the communication channel can be comprised of radio transmitters, radio receivers and/or radio transceivers commonly used in a Train Telemetry system.

In one preferred and non-limiting embodiment, when the first vehicle (e.g., the locomotive) is proximate to or has cleared the location on the track that is desired to be cleared, such as a reference object or marker at a target location, the operator (e.g., the locomotive engineer) signals this event to the one processor. e.g., by pressing a mechanical or virtual button. Alternatively, a remote sensor, e.g., a camera, that can identify the marker on or along the track can be used to identify this event.

In one preferred and non-limiting embodiment, in response to this event being signaled, the coordinates or reference value from the first GPS receiver are recorded. A data message including those coordinates is sent to the second processor on the rear of the train via the communication channel. In one preferred and non-limiting embodiment, the second processor can periodically or occasionally monitor or sample the second GPS receiver and compare each sample of the current GPS location output by the second GPS receiver to the reference value sent from the one processor.

In one preferred and non-limiting embodiment, as the last car of the train nears the target location, a data message can be sent to the locomotive to indicate the approach. When the current GPS location of the second GPS receiver matches the reference value within an acceptable window or tolerance, a data message (signal) can be sent to the first vehicle to signal the arrival of the last vehicle at the target location. In one preferred and non-limiting embodiment, this signal can also or alternatively be sent to another train as an indication that it can safely pass the target location.

In one preferred and non-limiting embodiment, the status of the location updates in the data messages from the second processor can be shown on a display in the first vehicle. This can allow an operator to stop the train clear of the referenced track obstacle.

Further preferred and non-limiting embodiments are set forth in the following numbered clauses.

Clause 1: A method of determining, for an intersection of first and second train tracks that includes a marker between said first and second train tracks, when a first train on the first track has traveled away from intersection a distance to permit travel of a second train on the second track through the intersection without risk of collision or contact between the first and second trains, wherein the first train includes a controller comprising one or more processors, the method comprising: (a) sampling, by the controller, first GPS data corresponding to a first geographical location of a lead vehicle of the first train travelling on the first track when the lead vehicle passes proximate the marker, (b) following step (a), sampling, by the controller, second GPS data corresponding to a second geographical location of a last vehicle of the first train moving on the first track; (c) following step (b), comparing, by the controller, the second GPS data and the first GPS data; (d) repeating steps (b)-(c) until the controller determines that the first geographical location corresponding to the first GPS data and the second geographical location corresponding to the second GPS data are within a predetermined distance of each other, and (e) in response to the controller determining that the first and second geographical locations are within the predetermined distance of each other, the controller generating a signal related to the condition that the first train has moved said distance.

Clause 2: The method of clause 1, wherein: the first train can travel in a first direction from the intersection toward the marker; and following step (e), the second train can travel in a second direction from the marker toward the intersection.

Clause 3: The method of clause 1 or 2, wherein step (e) can further include the controller delaying generating the signal until the first train has moved an additional time or distance after determining that the first and second geographical locations are within the predetermined distance of each other.

Clause 4: The method of any one of clauses 1-3, wherein the controller can comprise an end-of-train device (EOT) disposed on the last vehicle of the first train.

Clause 5: The method of any one of clauses 1-4, wherein: the comparison of step (c) can occur at the end-of-train device (EOT); and the EOT can receive the first GPS data via a communication network.

Clause 6: The method of any one of clauses 1-5, wherein: the first GPS data can be sampled from a first GPS receiver disposed on the lead vehicle of the first train: and the second GPS data can be sampled from a second GPS receiver disposed on the last vehicle of the first train.

Clause 7: The method of any one of clauses 1-6, wherein the first GPS data can be sampled in response to user input.

Clause 8: The method of any one of clauses 1-7, wherein the method can further include confirming, by a remote sensor, the presence of the marker proximate the lead vehicle of the first train.

Clause 9: A method of determining, for an intersection of first and second train tracks that includes a marker between said first and second train tracks, that a first train travelling on the first track has moved a distance away from the intersection to allow a second train on the second track to move through the intersection without risk of collision or contact with the first train, the method comprising: (a) sampling, by a controller of the first train, GPS data related to a geographical location of one vehicle of the first train passing proximate the marker, wherein the controller comprises one or more processors; (b) following step (a), sampling, by the controller, GPS data related to a geographical location of another vehicle of the first train; (c) determining, by the controller, if the geographical location of the GPS data sampled in step (a) and the geographical location of the GPS data sampled in step (b) are within a predetermined distance of each other; (d) if, in step (c), the controller determines that the geographical location of the GPS data sampled in step (a) and the geographical location of the GPS data sampled in step (b) are not within the predetermined distance of each other, the controller repeats steps (b) and (c) until the geographical location of the GPS data sampled in step (a) and the geographical location of the GPS data sampled in step (b) are within the predetermined distance of each other; and (e) generating, by the controller, a signal indicating that the first train has moved said distance.

Clause 10: The method of clause 9, wherein step (e) can further include the controller delaying generating the signal until the first train has moved an additional time or distance after determining that the first and second geographical locations are within the predetermined distance of each other.

Clause 11: The method of clause 9 or 10, wherein the signal can be communicated to the second train.

Clause 12: The method of any one of clauses 1-11, wherein: the first train can travel on the first track from the intersection toward the marker, and following step (e), the second train can travel on the second track from the marker toward the intersection.

Clause 13: The method of any one of clauses 1-12, wherein: the one vehicle of the first train can be a lead vehicle of the first train: and the other vehicle of the first train can be the last vehicle of the first train.

Clause 14: The method of any one of clauses 1-13, wherein the lead vehicle can be a locomotive.

Clause 15: The method of any one of clauses 1-14, wherein: the GPS data in step (a) can be sampled from a first GPS receiver on-board the one vehicle; and the GPS data in step (b) can be sampled from a second GPS receiver on-board the other vehicle.

Clause 16: The method of any one of clauses 1-15, wherein: the determining of step (c) can occur at an end-of-train device (EOT) disposed on the last vehicle of the first train; and the EOT can receive the GPS data sampled in step (a) via a train communication network.

Clause 17: The method of any one of clauses 1-16, wherein the GPS data in step (a) can be sampled in response to user input.

Clause 18: The method of any one of clauses 1-17, wherein the method can further include confirming, by a remote sensor, the presence of the marker proximate the one vehicle of the first train.

Clause 19: A method comprising: (a) sampling a first GPS location of a first vehicle of a first train moving through an intersection of first and second tracks that includes a marker between said first and second tracks as said first vehicle moves proximate said marker in a direction from the intersection toward the marker: (b) sampling a second GPS location of the last vehicle of the first train as the other vehicles of the first train move proximate the marker in a direction from the intersection toward the marker: (c) following step (b), if the second GPS location is not within a predetermined distance of the first GPS location, repeat step (b) until it is determined that the second GPS location is within the predetermined distance of the first GPS location; and (d) following step (c), outputting a signal indicating that the second GPS location is within the predetermined distance of the first GPS location.

Clause 20: The method of clause 19, wherein the predetermined distance can be greater than or equal to 4 cm, or greater than or equal to 1 meter, or greater than or equal to 3 meters.

BRIEF DESCRIPTION OF THE DRAWING(S)

Figure 3A:
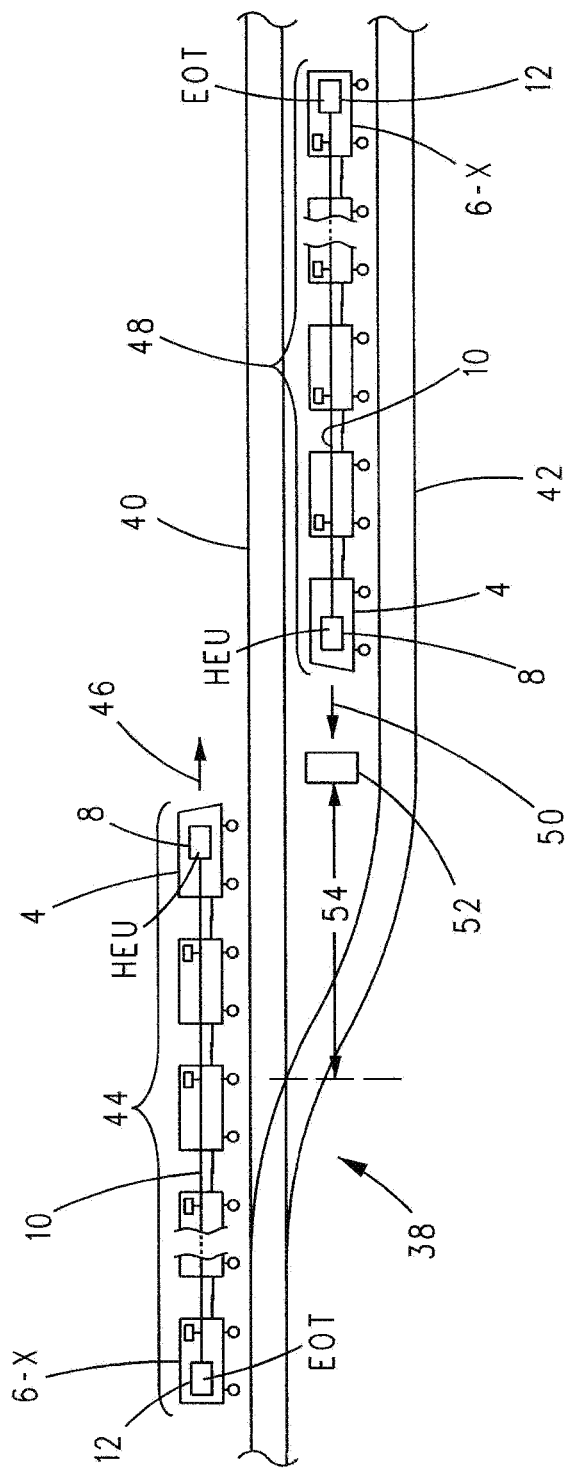
Figure 3B:
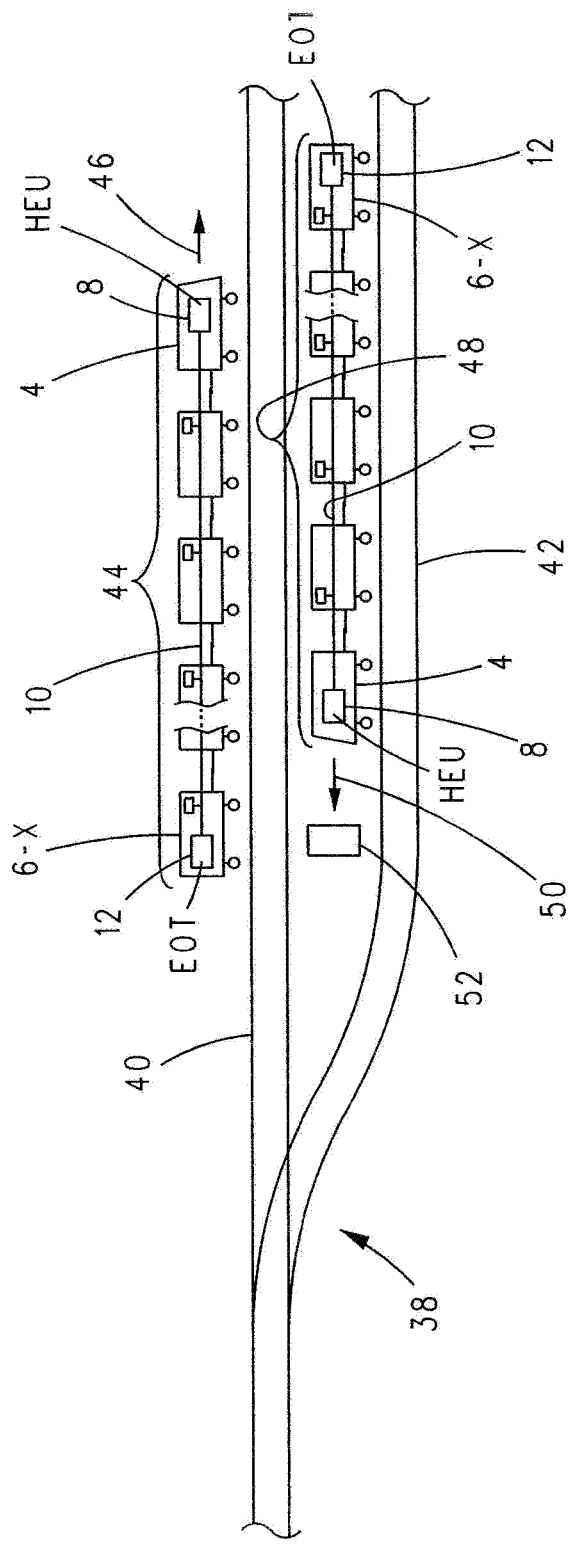
Figure 4:
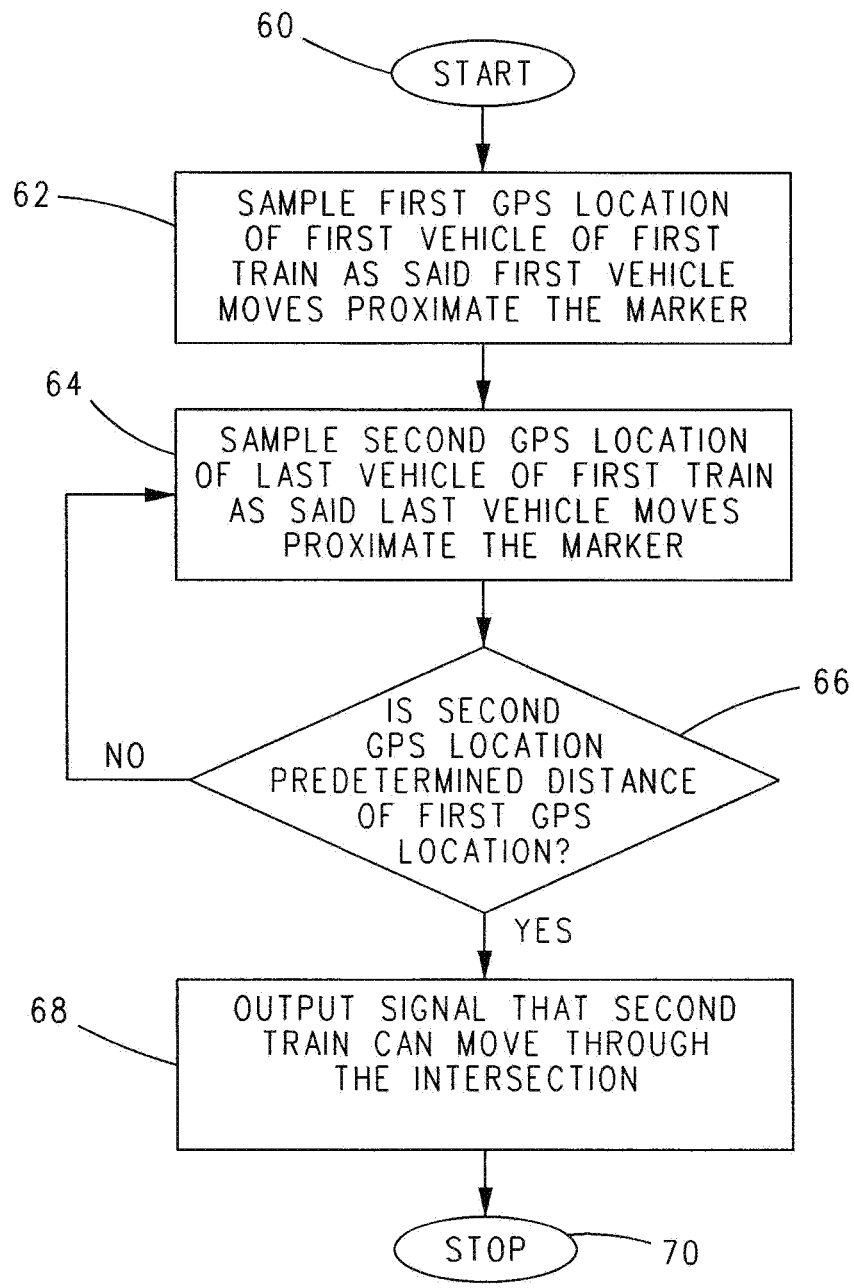

FIGS. 3A-3B are schematic illustrations of an intersection of first and second train tracks that includes a marker between said first and second train tracks, showing first and second positions of a first train travelling on the first track moving a distance away from the intersection to allow a second train on the second track to move through the intersection without risk of collision or contact with the first train in accordance with the principles described herein; and FIG. 4 is a method in accordance with the principles described herein.

DESCRIPTION OF THE INVENTION

Various non-limiting examples will now be described with reference to the accompanying figures where like reference numbers correspond to like or functionally equivalent elements.

For purposes of the description hereinafter, the terms "end," "upper," "lower," "right," "left." "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example (s) illustrated in the attached drawings, and described in the following specification, are simply exemplary examples or aspects of the invention. Hence, the specific examples or aspects disclosed herein are not to be construed as limiting.

Figure 1:
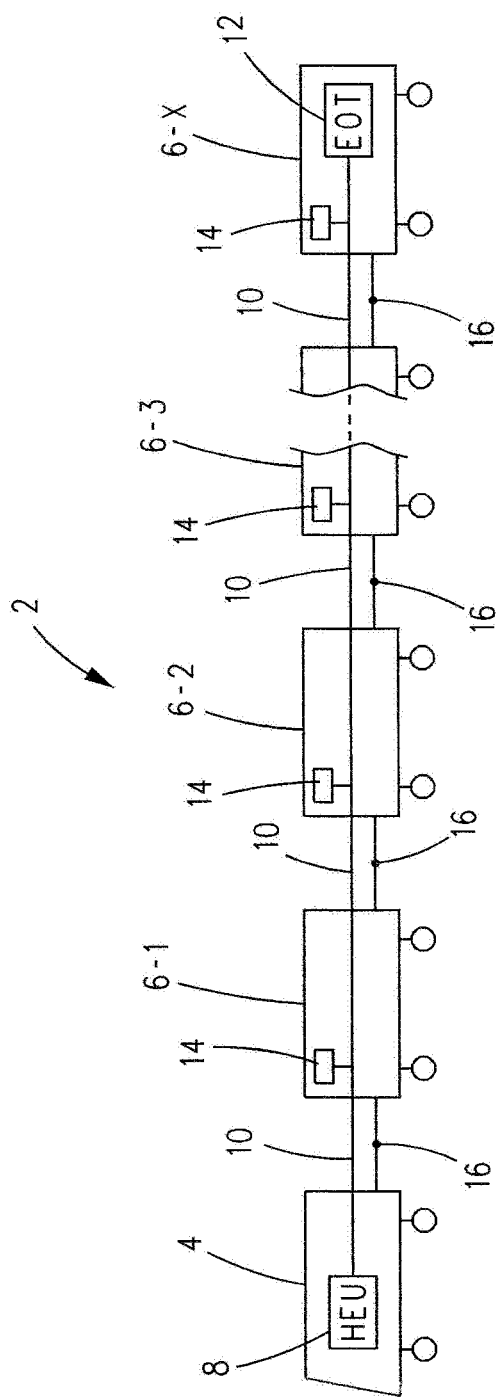
FIG. 1 is a schematic illustration of an example train that includes a lead rail vehicle, e.g. a locomotive, and X trailing rail vehicles or rail cars.

With reference to FIG. 1, in a non-limiting embodiment or example, a train 2 can include a locomotive 4 and a number of cars 6-1-6-X, where "X" can be any whole number greater than or equal to 2. In the example train 2 shown in FIG. 1, locomotive 4 is the lead vehicle of the train and car 6-X is the last vehicle of train 2. However, this is not to be construed in a limiting sense since it is envisioned that the lead vehicle of train 2 can be a car 6 other than locomotive 4, e.g., locomotive 4 can be positioned in train 2 between the lead vehicle and the last vehicle. For the purpose of the following description, locomotive 4 will be the lead vehicle of train 2.

In a non-limiting embodiment or example, locomotive 4 can include a head-end-unit (HEU) 8. HEU 8 can be coupled via a trainline 10 to an end of train (EOT) device 12 which, in a non-limiting embodiment or example, can be included in car 6-X. Optionally, HEU 8 can be coupled via trainline 10 to an electronically controlled pneumatic (ECP) controller 14 in each car 6. Each ECP controller 14 can, in a manner known in the art, respond to electronic braking commands from HEU 8 for controlling the brakes of each car, also in a manner known in the art.

In a non-limiting embodiment or example, mechanical couplers 16 can be utilized to couple proximate cars 6 to each other and to couple locomotive 4 to car 6-1 in a manner known in the art. Train 2 can include additional elements known in the art which are not shown in the figures for the purpose of simplicity. For example, it is understood that locomotive 4 includes a motor or engine that is utilized to provide motive force to train 2.

Figure 2:
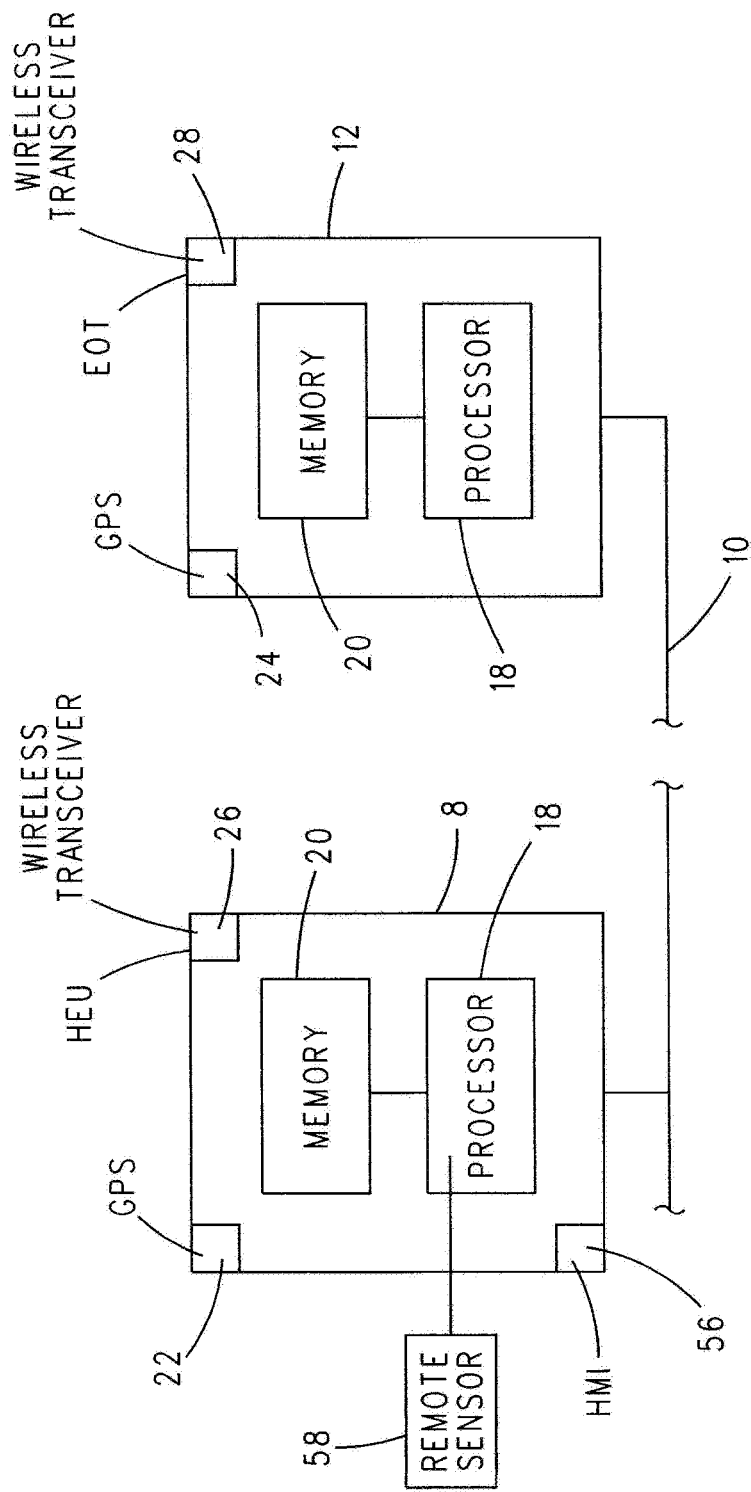
FIG. 2 is a schematic illustration of example elements. e.g., a processor and memory, comprising the head-end-unit (HEU) of the lead rail vehicle of the train and an end-of-train unit (EOT) disposed on the last rail vehicle of the train, and a trainline connecting the HEU and the EOT in communication.

With reference to FIG. 2 and with continuing reference to FIG. 1, in a non-limiting embodiment or example, trainline 10 acts in the nature of a communication network, such as, for example, without limitation, a local area network (LAN), between HEU 8 and at least EOT 12. EOT 12 is a device known in the art that can be mounted to the last vehicle of train 2 e.g., car 6-X, in lieu of a caboose. In a non-limiting embodiment or example, EOT 12 can be the terminal end of trainline 10 opposite HEU 8. However, this is not to be construed in a limiting sense.

In a non-limiting embodiment or example, HEU 8 and EOT 12 each include a processor 18 communicatively coupled to trainline 10 and a memory 20 coupled to processor 18 and operative for storing software control program (s) and/or operational data.

In non-limiting embodiment or example, herein, "controller" can include one or more processors 18 of HEU 8 and/or EOT 12. Hence, when discussing processing by a controller, it is to be understood that such processing can be performed by either one or both of processors 18 of HEU 8 and EOT 12. However, this is not to be construed in a limiting sense.

In a non-limiting embodiment or example, each memory 20 can include dynamic, volatile memory, e.g., RAM, that loses program code and data stored therein when power to memory 20 is lost or when overwritten by the corresponding processor 18, and a non-volatile memory. e.g., ROM, flash memory and the like, the latter of which (non-volatile) memory, can store at least, an embedded operating system and embedded data for use by the corresponding HEU 8 or EOT 12 processor 18 in the presence or absence of power being applied to the non-volatile memory of said processor 18. In a non-limiting embodiment or example, HEU 8 and EOT 12 can receive electrical power for their operation via trainline 10 from a battery or generator of locomotive 4.

In a non-limiting embodiment or example, HEU 8 can include or be coupled to a GPS receiver 22 disposed in locomotive 4 and EOT 12 can include or be coupled to a GPS receiver 24 disposed in car 6-X.

In a non-limiting embodiment or example, trainline 10 can be a wired network, a wireless network, or a combination of both a wired and a wireless network. In a non-limiting embodiment or example, HEU 8 and EOT 12 can be in communication wirelessly, e.g., via wireless transceivers 26 and 28 of HEU 8 and EOT 12.

In a non-limiting embodiment or example, with reference to FIGS. 3A-3B and with continuing reference to FIGS. 1 and 2, common to track networks worldwide is an intersection 38 (e.g., a track switch) where a first track 40 and a second track 42 come together. As an aid to avoiding contact or collision between a first train 44 (similar to train 2) traveling on first track 40 in a first direction 46 (to the right in FIG. 3A) and a second train 48 (similar to train 2) traveling on second track 42 in a second direction 50 (to the left in FIG. 3A) a marker 52 can be placed between first and second tracks 40, 42 a distance 54 away from intersection 38 of said first and second tracks 40, 42.

In a non-limiting embodiment or example, in FIG. 3A, distance 54 is for the purpose of illustration only and is not to be construed in a limiting sense since the actual distance 54 that marker 52 is placed from the intersection 38 of first and second tracks 40, 42 depends on a number of factors, including a curvature of track 42 at and proximate to intersection 38, the dimensions of vehicles of trains 44 and/or 48, and the like.

In the industry, marker 52 is also known as a fouling mark. A typical marker 52 is made of concrete or cement. However, this is not to be construed in a limiting sense since it is envisioned that marker 52 can be of any suitable and/or desirable design and can be made of any suitable and/or desirable material.

In a non-limiting embodiment or example, with ongoing reference to FIGS. 3A and 3B, from a starting condition where first train 44 is positioned to the left of marker 52 traveling from left to right through intersection 38 and second train 48 desires to pass from right to left through intersection 38, in order to allow safe passage of both trains 44 and 48 the front of vehicle 4 of second train 48 is positioned before (to the right) of marker 52. This will ensure that first train 44 can pass through intersection 38 in direction 46 without contacting or colliding with second train 48. To enable the detection of when car 6-X of first train 44 moving in direction 46 has cleared intersection 38 a distance to allow second train 48 to move through intersection 38 without contacting or colliding any vehicle 4 or 6 of first train 44. GPS receiver 22 of HEU 8 and GPS receiver 24 of EOT 12 can be utilized in the manner described next.

In a non-limiting embodiment or example, when locomotive 4 of first train 44 moving in a direction 46 is proximate to or passes marker 52, an indication of this passage can be input into the controller, in particular processor 18 of HEU 8. In a non-limiting embodiment or example, this indication can be input into the controller by, for example, an operator of train 44 via a human machine interface (HMI) 56 of HEU 8. In another example, the controller, in particular processor 18 of HEU 8, can determine from data supplied thereto by a remote sensor 58, such as a camera of train 44, when locomotive 4 of first train 44 moving in a direction 46 is proximate to or passes marker 52 and can, based on this determination, automatically generate this indication.

In response to this indication, the controller, in particular processor 18 of HEU 8, samples first GPS data output by GPS receiver 22 of HEU 8. This first GPS data corresponds to the geographical location of locomotive 4 of first train 44 traveling on first track 40 when locomotive 4 is proximate to or passes marker 52. In a non-limiting embodiment or example, this first GPS data can be communicated to processor 18 of EOT 12 via trainline 10.

Thereafter, as first train 44 continues moving in direction 46, the controller, in particular processor 18 of EOT 12, acquires a number of samples of second GPS data from second GPS receiver 24 and compares each sample of second GPS data to the first GPS data sampled from GPS receiver 22. The process of acquiring multiple samples of second GPS data from second GPS receiver 24 and comparing each sample of second GPS data to the first GPS data acquired from first GPS receiver 22 continues until the controller, e.g., in particular processor 18 of EOT 12, determines that the geographical location corresponding to the first GPS data and the geographical location corresponding to the second GPS data are within a predetermined distance of each other.

in response to the controller determining that the first and second geographical locations are within the predetermined distance of each other, the controller generates a signal. In a non-limiting embodiment or example, this signal relates to the condition that the first train 44 has traveled on first track 40 in a direction 46 away from the intersection 38 distance 54. e.g., sufficient to permit travel of second train 48 in direction 50 through intersection 38 without risk of collision or contact between first and second trains 44 and 48.

In a non-limiting embodiment or example, the "predetermined distance" used by the controller as a basis for generating the signal can be selected based on the GPS receiver 22 or 24 having the lowest GPS resolution or accuracy, also known as ranging error. To this end, as is known in the art, two GPS receivers positioned at the same location may output different GPS data depending on the GPS resolution or accuracy of each GPS receiver. The accuracy of any GPS receiver can be based on factors such as GPS satellite geometry, ranging error and local factors such as signal blockage, atmospheric conditions, and receiver design features/quality.

To account for this in accordance with the principles described herein, when the controller determines that the first and second geographical locations corresponding to the first and second GPS data are within a predetermined distance of each other, the controller, e.g., the processor 18 of EOT 12, is programmed to assume that the first and second geographical locations are a distance close to each other to be considered the same for the purposes of determining that car 6-X is proximate to or has passed marker 52, whereupon second train 48 on second track 42 can move through intersection 38 without risk of collision or contact with first train 44.

In one non-limiting embodiment or example, the predetermined distance can be less than or equal to 4 cm. In one non-limiting embodiment or example, the predetermined distance can be 0 cm, i.e., the controller determines that the first and second geographical locations corresponding to the first and second GPS data are the same geographical locations.

In a non-limiting embodiment or example, in practice, the use of this predetermined distance between the first and second geographical locations is a valid indication that first train 44 has cleared intersection 38 past marker 52 to permit second train 48 to pass through intersection 38 without risk of collision or contact with first train 44, regardless if second train 48 was stationary or moving when it was determined that the first and second geographical locations are within the predetermined distance of each other.

In a non-limiting embodiment or example, to ensure that first train has moved in direction 46 a distance past marker 52 (more than distance 54) to permit the safe passage of second train 48 through intersection 38, however, the controller can delay generating the signal an additional time or distance after determining that the first and second geographical locations are within the predetermined distance of each other.

In a non-limiting embodiment or example, the signal generated by the controller of first train 44 can be communicated to second train 48 in any suitable or desirable manner. In a non-limiting embodiment or example, the signal can be communicated to second train 48 via a wireless signal output by one of the wireless transceivers 26, 28 of first train 44. This wireless signal can be received by one or more wireless transceivers 26 and/or 28 of the HEU and/or EOT of second train 48. Upon receipt of this signal, a corresponding human perceivable indication can be output to the operator of second train 48. This human perceivable indication can be an audio indication, a visual indication, or the combination thereof.

In a non-limiting embodiment or example, comparison of each sample of the second GPS data acquired by GPS receiver 24 to the first GPS data acquired by GPS receiver 22 can occur at EOT 12, in particular, processor 18 of EOT 12. However, this is not to be construed in a limiting sense since it is envisioned that this comparison can occur at HEU 8.

In a non-limiting embodiment or example, the first GPS data can be acquired in response to user input. For example, an operator of train 44 can, via HMI 56 of HEU 8, input into the controller, in particular processor 18 of HEU 8, an indication when locomotive 4 has passed or is adjacent to or proximate marker 52.

With reference to the flow diagram of FIG. 4 and with continuing reference to FIGS. 1-3B, an instance of a method in accordance with the principles described herein starts by advancing from a Start step 60 to step 62 wherein a first GPS location of the first vehicle 4 (e.g., locomotive) of first train 44 is sampled as the first vehicle 4 moves proximate marker 52 in a direction away from intersection 38.

The method then advances to step 64 wherein a second GPS location of the last vehicle 6-X (e.g., locomotive) of the train 44 is sampled as the other vehicles 6 of first train 44 move proximate marker 52 in a direction away from the intersection 38. In step 66, it is determined if the second GPS location is within the predetermined distance of the first GPS location. If not, the method repeats steps 64 and 66 until, in an instance of step 66, it is determined that the second GPS location is indeed within the predetermined distance of the first GPS location. Thereafter, at step 68 a signal is output indicating that first train 44 has cleared intersection 38 and has moved at least past marker 52 in a direction away from intersection 38 such that the second train 48 can safely pass through intersection 38 without risk of contact with the first train 44. Thereafter, the method advances to Stop step 70, whereupon this instance of the method terminates.

The method shown in FIG. 4 can be repeated each time first train 44 passes through an intersection 38 of first and second tracks 40, 42 that includes a marker 52 between said first and second tracks 40, 42.

As can be seen, disclosed is a method of determining, for an intersection 38 of first and second train tracks 40, 42 that includes a marker 52 between said first and second train tracks 40, 42, when a first train 44 on the first track 40 has traveled away from the intersection 38 a distance to permit travel of a second train 48 on the second track 42 through the intersection 38 without risk of collision or contact between the first and second trains 44, 48, wherein the first train 44 includes a controller comprising one or more processors 18. The method comprises: (a) sampling, by the controller, first GPS data corresponding to a first geographical location of a lead vehicle 4 of the first train 44 travelling on the first track 40 when the lead vehicle 4 passes proximate the marker 52; (b) following step (a), sampling, by the controller, second GPS data corresponding to a second geographical location of a last vehicle 6-X of the first train 44 moving on the first track 40; (c) following step (b), comparing, by the controller, the second GPS data and the first GPS data; (d) repeating steps (b)-(c) until the controller determines that the first geographical location corresponding to the first GPS data and the second geographical location corresponding to the second GPS data are within a predetermined distance of each other; and (e) in response to the controller determining that the first and second geographical locations are within the predetermined distance of each other, the controller generating a signal related to the condition that the first train 44 has traveled on the first track away from the intersection 38 said distance.

The first train 44 can travel in a first direction 46 from the intersection 38 toward the marker 52. Following step (e), the second train 48 can travel in a second direction 50 from the marker 52 toward the intersection 38.

Step (e) can include the controller delaying generating the signal until the first train 44 has moved an additional time or distance after determining that the first and second geographical locations are within the predetermined distance of each other.

The controller can comprise an end-of-train device (EOT) 12 disposed on the last vehicle 6-X of the first train 44.

The first GPS data can be sampled by the controller from a first GPS receiver 22 disposed on the lead vehicle 4 of the first train 44. The second GPS data can be sampled by the controller from a second GPS receiver 24 disposed on the last vehicle 6-X of the first train 44.

The comparison of step (c) can occur at an end-of-train device (EOT) disposed on the last vehicle of the first train. The EOT can receive the first GPS data via a communication network 10.

The first GPS data can be sampled in response to user input, e.g., via HMI 56.

The method can further include confirming, by a remote sensor (e.g., a camera) 58, the presence of the marker 52 proximate the lead vehicle 4 of the first train 44.

Also disclosed herein is a method of determining, for an intersection 38 of first and second train tracks 40, 42 that includes a marker 52 between said first and second train tracks 40, 42, that a first train 44 travelling on the first track 40 has moved a distance away from the intersection 38 to allow a second train 48 on the second track 42 to move through the intersection 38 without risk of collision or contact with the first train 44. The method comprises: (a) sampling, by a controller of the first train 44, GPS data related to a geographical location of one vehicle 4 of the first train 44 passing proximate the marker 52, wherein the controller comprises one or more processors; (b) following step (a), sampling, by the controller, GPS data related to a geographical location of another vehicle 6-X of the first train 44; (c) determining, by the controller, if the geographical location of the GPS data sampled in step (a) and the geographical location of the GPS data sampled in step (b) are within a predetermined distance of each other; (d) if, in step (c), the controller determines that the geographical location of the GPS data sampled in step (a) and the geographical location of the GPS data sampled in step (b) are not within the predetermined distance of each other, the controller repeats steps (b) and (c) until the geographical location of the GPS data sampled in step (a) and the geographical location of the GPS data sampled in step (b) are within the predetermined distance of each other; and (e) generating, by the controller, a signal indicating that the first train 44 has moved said distance.

Step (e) can further include the controller delaying generating the signal until the first train 44 has moved an additional time or distance after determining that the first and second geographical locations are within the predetermined distance of each other.

The signal can be communicated to the second train 48.

The first train 44 can travel on the first track from the intersection 38 toward the marker 52. Following step (e), the second train 48 can travel on the second track 42 from the marker 52 toward the intersection 38.

The one vehicle of the first train can be a lead vehicle 4 of the first train. The other vehicle of the first train can be the last vehicle 6-X of the first train. The lead vehicle can be a locomotive.

The GPS data in step (a) can be sampled from a first GPS receiver on-board the one vehicle. The GPS data in step (b) can be sampled from a second GPS receiver on-board the other vehicle.

The determining of step (c) can occur at an end-of-train device (EOT) disposed on the last vehicle of the first train. The EOT can receive the GPS data in step (a) via a train communication network.

The GPS data in step (a) can be sampled in response to user input.

The method can further include, confirming, by a remote sensor 58, the presence of the marker proximate the one vehicle of the first train.

Also disclosed herein is a method comprising: (a) sampling a first GPS location of a first vehicle 4 of a first train 44 moving through an intersection 38 of first and second tracks 40, 42 that includes a marker 52 between said first and second tracks 40, 42 said first vehicle 4 moves proximate said marker 52 in a direction from the intersection 38 toward the marker 52; (b) sampling a second GPS location of the last vehicle 6-X of the first train 44 as the other vehicles 6 of the first train 44 move proximate the marker 52 in a direction from the intersection 38 toward the marker 52; (c) following step (b), if the second GPS location is not within a predetermined distance of the first GPS location, repeat step (b) until it is determined that the second GPS location is within the predetermined distance of the first GPS location; and (d) following step (c), outputting a signal indicating that the second GPS location is within the predetermined distance of the first GPS location.

The predetermined distance can be greater than or equal to 4 cm, or greater than or equal to 1 meter, or greater than or equal to 3 meters.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method comprising:
sampling first location data corresponding to a first location of a first vehicle of a vehicle system when the first vehicle passes a marker;
sampling second location data corresponding to a second location of a second vehicle of the vehicle system;
determining whether the first location and the second location are within a predetermined distance of each other; and
in response to determining that the first and second locations are within the predetermined distance of each other, generating a signal related to a condition that the first location and the second location are within the predetermined distance.

2. The method of claim 1, wherein:
determining whether the first location and the second location are within the predetermined distance of each other comprises comparing the second location data and the first location data and repeating sampling of the second location data and repeating the comparing until the first location and the second location are within the predetermined distance.

3. The method of claim 1, wherein determining that the first and second locations are within the predetermined distance of each other includes delaying generating the signal until the vehicle system has moved one or more of an additional time or an additional distance after determining that the first and second locations are within the predetermined distance of each other.

4. The method of claim 1, wherein:
the first location data is sampled by a first processor disposed on the first vehicle of the vehicle system; and
the second location data is sampled by a second processor disposed on the second vehicle of the vehicle system.

5. The method of claim 4, wherein:
comparing the second location data and the first location data occurs at the second processor; and
the second processor receives the first location data via a communication network.

6. The method of claim 4, wherein:
the first location data is sampled from a first receiver disposed on the first vehicle of the vehicle system; and
the second location data is sampled from a second receiver disposed on the second vehicle of the vehicle system.

7. The method of claim 1, wherein the first location data is sampled in response to user input.

8. The method of claim 1, further including confirming, by a remote sensor, a presence of the marker proximate the first vehicle of the vehicle system.

9. The method of claim 1, further comprising communicating the signal to a second vehicle system.

10. The method of claim 9 wherein:
the vehicle system travels from an intersection toward the marker; and
the second vehicle system travels from the marker toward the intersection.

11. The method of claim 1, wherein:
the first vehicle is a lead vehicle of the vehicle system; and
the second vehicle is a last vehicle of the vehicle system.

12. The method of claim 11, wherein the lead vehicle is a locomotive.

13. The method of claim 11, wherein:
the first location data and the second location are sampled from receivers on-board the first vehicle and the second vehicle, respectively.

14. The method of claim 13, wherein:
determining whether the first and second locations are within the predetermined distance of each other is performed by a processor on-board the second vehicle that receives the first location data via a communication network.

15. The method of claim 1, wherein the predetermined distance is four centimeters or less.

16. The method of claim 8, wherein the first location data is automatically sampled in response to the remote sensor detecting the presence of the marker proximate the first vehicle.

17. A method comprising:
sampling a first location of a first vehicle moving through an intersection that includes a marker as the first vehicle moves proximate the marker in a direction from the intersection toward the marker;
sampling a second location of a second vehicle interconnected with the first vehicle during movement proximate the marker in the direction from the intersection toward the marker;
repeating sampling of the second location until the second location is within a predetermined distance of the first location; and
generating a signal indicating that the second location is within the predetermined distance of the first location.

18. The method of claim 17, wherein the predetermined distance is four centimeters or less.

* * * * *